Figure 6:
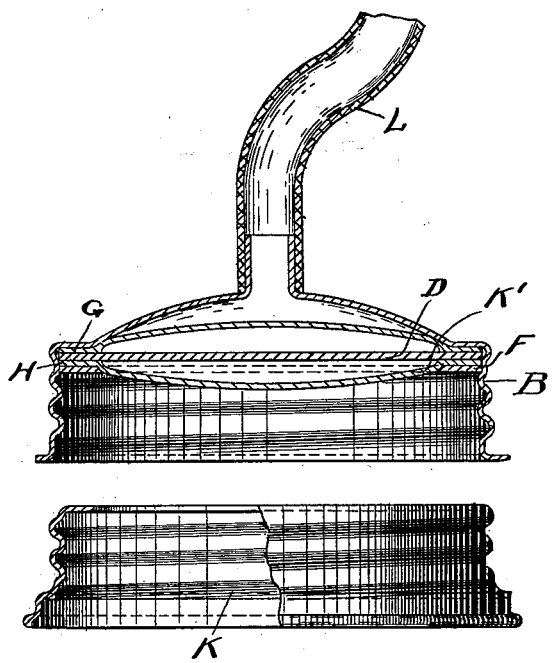

No. 636,489. Patented Nov. 7, 1899.
W. M. CLARKE.
FILTER.
(Application filed July 5, 1898.)
(No Model.) 2 Sheets—Sheet 1.
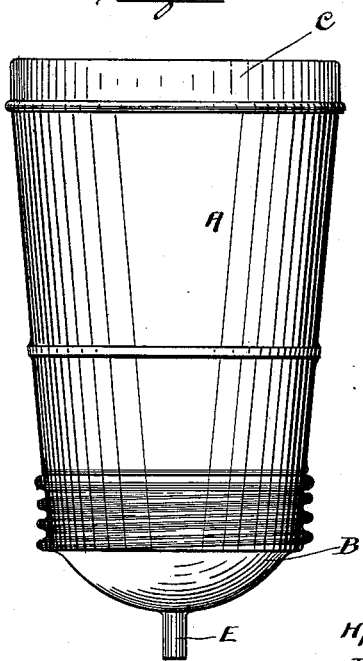
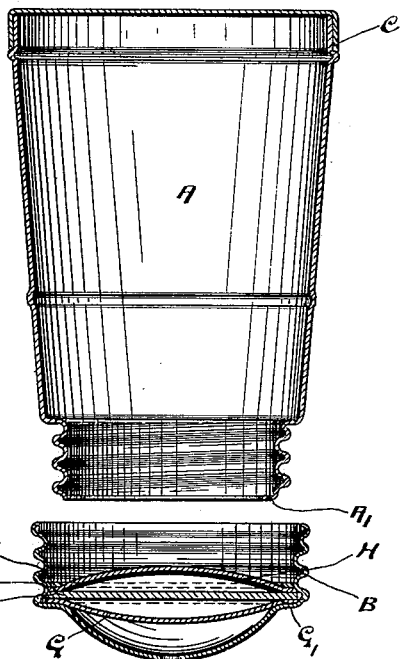
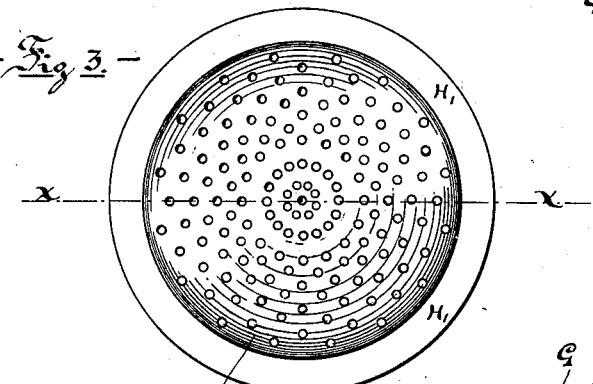
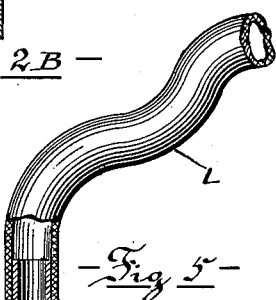
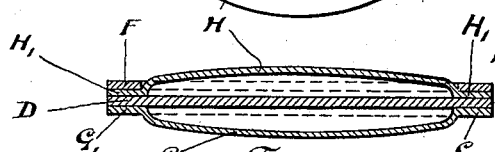
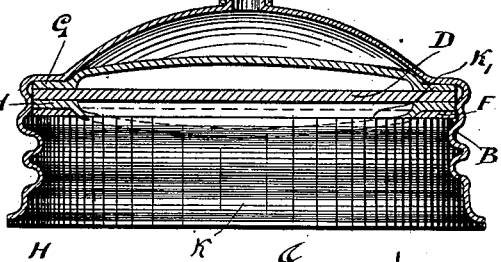
Witnesses —
Frederick E. Appley.
Charles W. Brown.
Inventor —
William M. Clarke
by his Attorney
August M. Treadwell No. 636,489. Patented Nov. 7, 1899.
W. M. CLARKE.
FILTER.
(Application filed July 5, 1898.)
(No Model.) 2 Sheets—Sheet 2.

Witnesses: Inventor
William M. Clarke
By
His attorney

UNITED STATES PATENT OFFICE.

WILLIAM M. CLARKE, OF NEWARK, NEW JERSEY.

FILTER.

SPECIFICATION forming part of Letters Patent No. 636,489, dated November 7, 1899.

Application filed July 5, 1898. Serial No. 685,115. (No model.)

*To all whom it may concern:*

Be it known that I, WILLIAM M. CLARKE, a citizen of the United States, residing at Newark, in the county of Essex and State of New Jersey, have invented certain new and useful Improvements in Filters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has for its object to simplify the means utilized for filtering water in stationary filters, and, furthermore, to render these same simplified filtering means practical for the use of portable filters. In this latter capacity my invention will probably meet a long-felt want, inasmuch as portable filters, more especially of pocket or knapsack dimensions, have not been in use or existed to any great extent. I therefore feel confident that this new portable filter invented by me will prove of great value to travelers who find themselves in districts where the water is muddy or brackish, and where large filtering apparatus inconvenient of transportation cannot be carried along, and where stationary filtering apparatus do not exist.

Referring to the accompanying drawings, where like letters of reference indicate corresponding parts in the different views, Figure 1 shows a full view of the stationary reservoir;
Fig. 2$^A$, a sectional view of the reservoir A on the axial center line of Fig. 1; Fig. 2$^B$, a sectional view on the axial center line of Fig. 1, illustrating the filtering-compartment B detached from the reservoir A; Fig. 3, a top view of the filtering-disk inclosing the asbestos matter; Fig. 4, a sectional view of the filtering-disks on a line X X of Fig. 3; Fig. 5, a sectional view of my improved portable filter with the disk-retaining cap lying inside shown in full, and Fig. 6 is a view showing the cap K separate from the compartment B.

A indicates the filtering-reservoir, having a lid C, said reservoir containing the water undergoing the process of filtration, which for hygienic reasons is generally made of copper, but can of course, all according to conditions and circumstances, be made of glass or any other suitable material.

B is the filtering-compartment, containing the filtering means, adapted to be screwed on or otherwise attached to the main reservoir A and is furnished with a spout E as a passage-way for the filtered water. The means constituting the filtering elements proper consist of, as seen in Fig. 2$^B$, two disks H and G, having an asbestos disk D lying between them. It will be observed that the two said disks H and G are arc-formed, and that they are formed with flat circumferential flanges, respectively H' on H and G' on G. Between these latter circular flanges the asbestos disk D is compressed—first, so as to hold it there on a small circumferential surface in order to leave as great a filtering-surface as possible between the opposed arcs, and, secondly, to insure a water-tight joint between the edges of the flanges formed by the layers of the two disks H and G and the asbestos disk D and the inside surface of the filtering-compartment B. It has, however, been found practical and safer, as regards the escape of any of the water in process of being filtered around the edge of this aforementioned flange layer, to attach a flange F, made of any adequate water-tight material, such as rubber or felt, between the lower flange A' on the reservoir A and the adjacent disk H. The disks H and G are, as seen in Fig. 3, perforated on their arced surfaces to provide means of egress and ingress for the water in the reservoir. The shape or contour of the arc in these disks can be different, the shape shown in Fig. 4 having the advantage of forming a safer and more absolute bearing for the water-tightening flange F. It will now be understood that when the two arc-shaped disks, having the asbestos flange secured between them and the water-tightening flange F lying on top, are inserted in the filtering-compartment B and the reservoir A is screwed down into said part B the flange A' on reservoir A will bear directly against the flange F and indirectly will press the aforesaid disks H and G together around the asbestos disk D, producing thus a simple efficient filtering apparatus. When the asbestos disk has become saturated with impure matter, the parts are unscrewed and another asbestos disk is inserted, to which end several disks are furnished with each apparatus.

Proceeding to the description of Figs. 5 and 6, which illustrate my portable pocket-filter shown in about its natural size, it will be seen that the principle residing in having the two arc-shaped disks H and G with the asbestos disk D compressed at the circumference between them remains the same, the difference consisting in the fact that instead of having the reservoir A to secure these parts together inside of the filtering-compartment D a cap K, (shown in full,) screw-cut to correspond with the compartment B, is screwed thereinto and with its flange K' performs the same function which flange A' performed in the case of reservoir A. As the spout E in this instance is furnished, as illustrated, with a rubber tube L, it will be apparent that the portable filtering apparatus here described can be sunk into any kind of water whether contained in a vessel or encountered in the open country in pools, ditches, streams, or lakes, the water being sucked up through the aforementioned tube, thus undergoing the process of filtration during the process of suction. That various details can be altered from time to time, improving, for instance, the means of attaching the filtering-compartment B to the reservoir A, and the means for drawing the water through the portable filtering apparatus shown in Fig. 5 is apparent, and, further, that modifications in attaching the two arc-shaped disks and the asbestos disk water-tight together might be found I am well aware of; but

What I claim, and desire to secure protection for by Letters Patent, is—

1. A filtering apparatus consisting of a compartment having a bearing-flange and adapted to receive water and a filtering-compartment screwed into each other, two arc-shaped disks and an asbestos disk compressed at the circumference by the screw action of the flange of the water-receiving compartment on an offset in the filtering-compartment and a water-tight flange placed intermediate the said compartment-flange and the adjacent arc-shaped disk, substantially as described.

2. A suction-filter consisting of a filtering-compartment having a spout with suction means attached, two arc-shaped disks compressing an asbestos disk at the circumference situated in said filtering-compartment, a water-tight flange placed adjacent to the bottom arc-shaped disk and a screw-cut cap fitting into the similarly-screw-cut filtering-compartment, pressing the arc-shaped disks, water-tight flange and asbestos disk against the inside flat surface of the filtering-compartment, substantially as it is illustrated, and described.

In testimony that I claim the foregoing I have hereunto set my hand this 30th day of June, A. D. 1898.

WILLIAM M. CLARKE.

Witnesses:
 FRANK B. SMITH,
 AUGUST M. TRESCHOW.